T. H. Brady.
Faucet Connection.
No. 96,545. Patented Nov. 9, 1869.
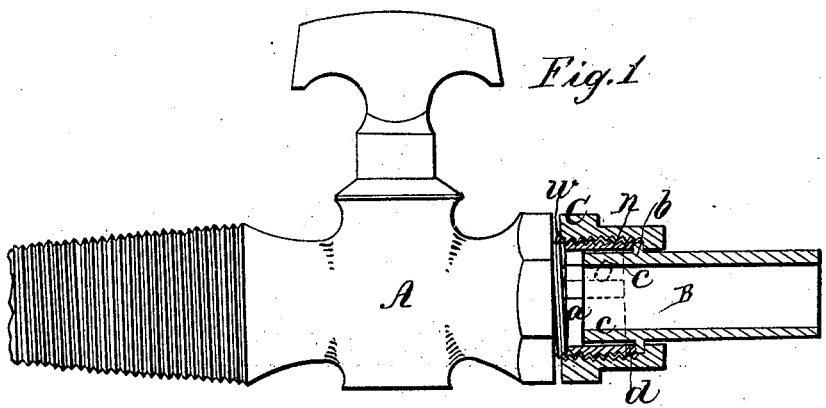
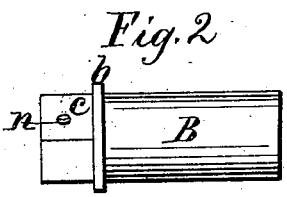
Witnesses
Virgil Cornish
C. E. Mitchell
Inventor
Thomas H. Brady
By James Shepard Atty.

United States Patent Office.

THOMAS H. BRADY, OF NEW BRITAIN, CONNECTICUT.

Letters Patent No. 96,545, dated November 9, 1869.

IMPROVEMENT IN FAUCET-CONNECTION.

The Schedule referred to in these Letters Patent and making part of the same.

*To all whom it may concern:*

Be it known that I, THOMAS H. BRADY, of New Britain, in the county of Hartford, and State of Connecticut, have invented a new and improved Faucet-Connection; and I do hereby declare that the following is a full, clear, and exact description thereof, reference being had to the accompanying drawings, making a part of this specification, in which—

Figure 1 is a sectional view of my invention.
Figure 2 is a side elevation of the conducting-tube.
Figure 3 is an end view of the same.

Similar letters of reference indicate like parts.

My invention consists in providing the inside end of the conducting-tube with a suitable tenon, which is either squared or of irregular shape, and is received in a corresponding-shaped recess in the end of the faucet-barrel, in such manner that the said conducting-tube cannot revolve and twist the pipe while being secured to the faucet.

A designates a faucet-barrel, the end of which is threaded in the usual manner, and further provided with a square recess, $a$.

B designates the conducting-tube, to which the pump or fountain-pipe is designed to be soldered.

The tube B is provided with a fixed collar or an annular rim, $b$, and with a tenon $c$, which tenon is squared of the proper size to fit the recess $a$.

C designates the thimble-nut, for securing the tube B and faucet-barrel A to each other, while the washer or packing $d$ prevents leakage.

To connect this faucet to a pump or fountain, the thimble-nut C is slipped over the tube B, and the fountain-pipe is soldered to said tube. The washer $d$ is then placed over the tenon $c$, which tenon is inserted in the recess $a$. The thimble-nut C is then screwed on, so as to firmly compress the washer $d$, and make an air-tight connection, while the tenon $c$, in the recess $a$, prevents the tube from rotating with the thimble-nut C, and thereby twisting the pipe, or unsoldering it from the tube B.

It is obvious that the object of the invention can be accomplished by making the tenon $c$ and recess $a$ of any irregular shape, or the body of the tenon could be made round, and provided with a pin or pins, and the recess made in the barrel to correspond with the same.

I therefore show a pin, $n$, and groove $m$, which would, with a round tenon, accomplish the same result as is now accomplished by the squared tenon and recess.

All the parts shown, except the tenon $c$, recess $a$, pin $n$, and groove $m$, are substantially the same as the ordinary faucet-connection, and consequently, without the improvement, the other parts are not claimed as my invention.

In the ordinary faucet-connection, as the thimble-nut C begins to press the collar of the tube B, (which ordinarily has no tenon $c$,) the tube has a tendency to rotate, and often revolves so as to unsolder the pipe, or twist the same, so as to necessitate frequent repairing.

By my invention, the above objection or inconvenience is entirely overcome.

What I claim as new, and desire to secure by Letters Patent, is—

The conducting-tube B, when provided with shoulder or collar $b$ and a squared tenon, $c$, or its equivalent, in combination with the thimble-nut C, barrel A, and recess $a$, the whole combined and arranged so as to prevent the rotation of the tube B, substantially as described.

THOMAS H. BRADY.

Witnesses:
   THOS. MARKLEY,
   JAMES SHEPARD.